J. H. DALBEY.
RESILIENT CORE FOR TIRES.
APPLICATION FILED APR. 16, 1920.
1,351,894.
Patented Sept. 7, 1920.
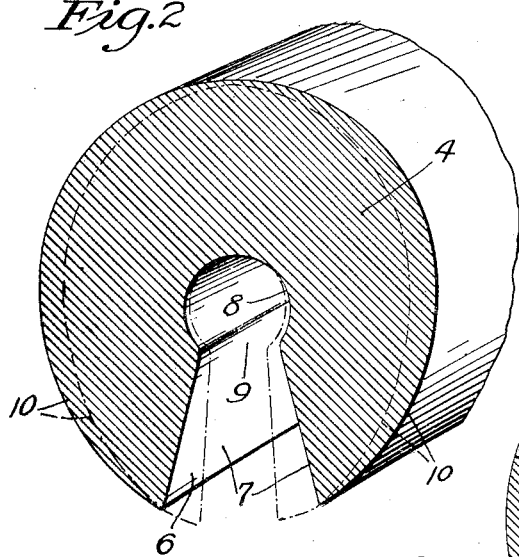
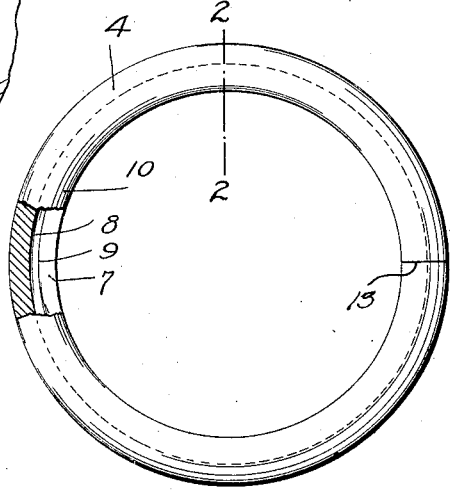
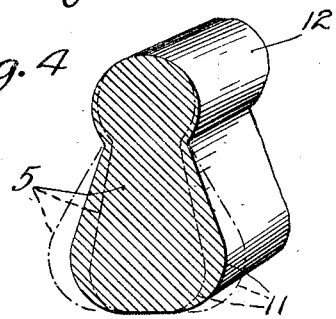
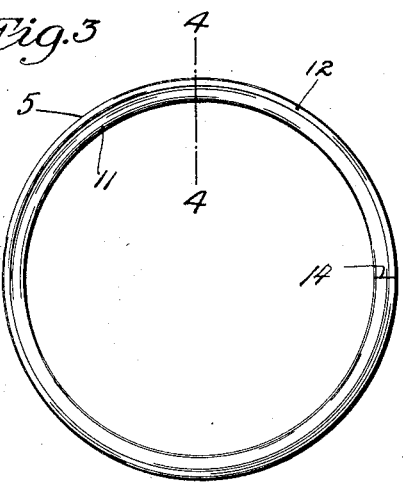
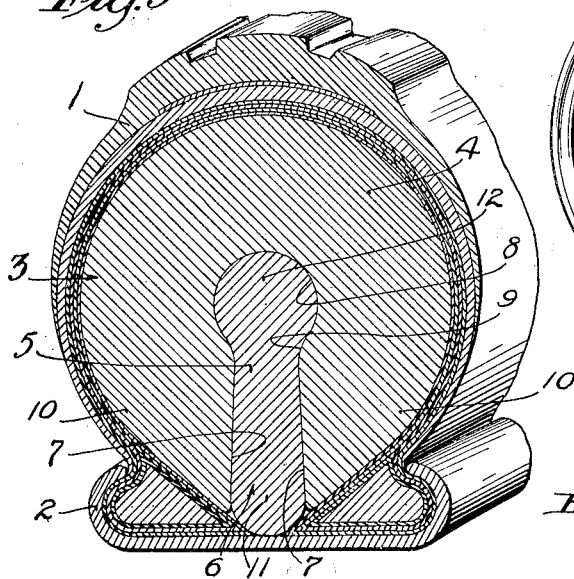
Inventor
James H. Dalbey
By Murray Lotz & Wilson
Attys

UNITED STATES PATENT OFFICE.

JAMES H. DALBEY, OF ELGIN, ILLINOIS, ASSIGNOR TO ELGIN RUBBER ACE COMPANY, OF ELGIN, ILLINOIS, A CORPORATION OF ILLINOIS.

RESILIENT CORE FOR TIRES.

1,351,894.  Specification of Letters Patent.  Patented Sept. 7, 1920.

Application filed April 16, 1920. Serial No. 374,313.

*To all whom it may concern:*

Be it known that I, JAMES H. DALBEY, a citizen of the United States, and resident of Elgin, in the county of Kane and State of Illinois, have invented certain new and useful Improvements in Resilient Cores for Tires, of which the following is a specification.

My invention relates to improvements in resilient tires for vehicles and has special reference to improvements in resilient cores for such tires.

The object of my invention is to provide a core which shall be substantially permanent, once it is installed, to provide a core made of a main circumferential body which shall be capable of being changed in its transverse area to fit casings of different sizes and a second circumferential member of relatively small cross section for use with the main body portion, the second member being capable of being replaced by other similar members of similar shape but different sizes, as may be necessary, to cause the core as a whole to fit the desired casing.

The resilient core of this invention is adapted to replace an air tube and the air of a pneumatic tire and thus avoid the objectionable features of a pneumatic tire, while at the same time providing a tire which retains substantially all of the desirable features relative to resiliency and ease of riding of such tires.

My invention resides in a resilient tire core made of spongy rubber or other like or suitable substance and comprising a body having a cross section approximately the interior shape and dimension of the casing to be filled and having a wedge shaped circumferential slot or groove entering into an enlarged inner circular opening, and an auxiliary ring member adapted to fill said slot and opening and hold the main body expanded to fit the casing.

An important feature of my invention relates to the reduction in capital tied up by the seller of such cores, as a relatively few of the main cores of standard dimensions need to be carried in stock, with a selection of various sizes of auxiliary members in order to meet substantially any need which may arise as to the filling of various sized casings. Once a casing has been filled and placed upon a suitable rim, the tire as a whole is substantially permanent and will last, in its form as produced, until the casing is worn through or otherwise gives away.

My invention will be more readily understood by reference to the accompanying drawing forming part of this specification, and in which—

Figure 1 is a side elevation, partly broken away, of one of the main core members or rings;

Fig. 2 is a fragmentary, perspective, sectional view of the main core member on the line 2—2 of Fig. 1;

Fig. 3 is a side elevation of the auxiliary core member;

Fig. 4 is a fragmentary perspective sectional view of the auxiliary core member on the line 4—4 of Fig. 3 and;

Fig. 5 is a fragmentary, perspective, cross sectional view of a tire casing fitted with a core and mounted upon a suitable tire rim and embodying my invention.

In said drawings, 1 represent a tire casing from which it is desired to eliminate the air tube with its attendant difficulties.

The casing is mounted for use upon a tire rim 2 which is shown as being the ordinary clencher type though obviously it could be of the well known straight side Dunlap type as well.

I provide a yielding core 3 for the casing which I preferably make of spongy rubber or some similar yielding or resilient substance.

The core as a whole is made enough larger than the opening in the casing so that when the casing is clamped upon the tire rim 2 with the core 3 within it the casing will be supported with sufficient rigidity to properly sustain the load to which it is to be subjected.

The core, when compressed within the casing takes the shape of the interior of the casing and completely fills same.

It is found in practice that tire casings of different makes, as well as those of the same make, vary as to internal dimensions, particularly as to transverse cross-sectional area, even among casings which are supposed to be the same size.

It is this difficulty as to the preparation of cores with which to fill the casings, or as to filling casings of various makes as a commercial proposition, that is a particular feature of my invention.

For this purpose I make the core 3 of a main ring member 4 and an auxiliary ring member 5. I make the main member 4 easily adjustable as to cross-sectional dimension by providing a circumferential groove or slot 6 therein. Preferably this groove takes the shape, best shown in Fig. 2, of an opening extending around the periphery of the main core 4 which is wedge-shaped having sides 7 which flare outwardly from the interior of the core through the inner surface thereof and which opening merges into an enlarged circumferential opening 8 which may be substantially circular in cross-sectional shape as shown. The diameter of the central opening 8 is preferably larger than the inner end 9 of the wedge-shaped opening 6, the complete opening consisting of the wedge-shaped opening 6 and the inner opening 8 together forming a keyhole-shaped opening which permits the two sides 10 of the core member 4 to be spread apart to enlarge the cross-sectional area of the core or to be squeezed toward each other to diminish the cross sectional area thereof.

While the main core 4, as thus constructed, can readily be spread or contracted, I preferably, in practice, make it to fit or fill, in combination with the largest sized wedging ring, the largest size of casing to which it is to be applied and I provide smaller wedging rings for use with it to properly fill casings of smaller cross sectional area. In other words, I preferably compress instead of expand the main core member.

For retaining the main body 3 with the sides 10 distended or spread apart the required distance to cause the core as a whole to properly fill the casing to which it is to be applied, I provide a series of the auxiliary fillers 5 which vary in cross sectional dimensions particularly in the wedge-shaped portion 11 thereof, as shown in full and dotted lines in Fig. 4.

In preparing a core for filling a specific casing, the dimensions of which are known, such as a 32x4 of a certain make, a 32x4 main core member 4 is selected and one of the auxiliary filler rings 5 is selected which will in combination with the core member 4 produce a core suitable for the specific casing.

The auxiliary filler ring is then inserted into the main body 4 of the two sides 10 of the main core being spread apart to permit the head 12 of the auxiliary member to be pushed into the inner opening 8 of the main core member. Then the core as a whole is placed within the casing and the casing is mounted on the tire rim 2. Sometimes it is more convenient to place the main core member 4 in the casing first and afterward spread the device apart and insert the proper wedging auxiliary member 5. In any event the mounting of the casing upon the tire rim 2 tightly compresses the core as a whole and produces pressure enough upon same to provide sufficient rigidity to properly sustain the load.

In Figs. 1 and 3 I have shown cuts 13 and 14 respectively, illustrating that both the main core 4 and the auxiliary member 5 may be cut at one point and that they can readily be changed as to circumferential dimensions to be used in casings of various sizes.

As many modifications of my invention will readily suggest themselves to one skilled in the art, I do not limit or confine my invention to the specific structures herein shown and described except within the scope of the appended claims.

I claim:

1. A resilient tire core comprising a main ring-like core member and an auxiliary member, the main member being substantially circular in cross section and having a circumferential wedge-shaped slot or opening terminating at its inner part in an enlarged circumferential opening, the auxiliary member having a wedge shaped body and an enlarged section at the point of the wedge adapted in combination with the main body to complete a core free of any open spaces, substantially as described.

2. A resilient tire core comprising a main core member capable of being transversely expanded to fit different sized casings, a circumferential wedging member for expanding the main body, and coöperating shouldered parts on the two members for locking the wedging member against movement relatively to the main member, substantially as described.

3. A resilient tire core comprising a main ring core member having a keyhole-shaped slot or groove extending circumferentially around the ring, and an auxiliary member of like section adapted to completely fill the groove, substantially as described.

4. A resilient tire core comprising a main ring member having a keyhole-shaped circumferential slot or groove having flared sides, and an auxiliary member of like cross-section for filling the groove and adapted to be held against movement relatively to the main member, and in accordance with the dimensions of the auxiliary member making the core larger or smaller in transverse cross-sectional area as and for the purpose specified.

5. Means for filling a selected tire casing with a resilient core which comprises a main core ring of substantially the cross-sectional area of the casing, and having a keyhole-shaped circumferential slot having flared sides, a wedging ring adapted to fill said slot and having a head portion for retaining the wedging ring in position, wedging rings of various dimensions being provided whereby cores of different cross-sectional areas can be produced from a single main core member, substantially as described.

6. The improvements herein described comprising a composite core of resilient material for completely filling a tire casing and consisting of a main ring filler member having a wedging slot in its inner side terminating in an enlarged substantially central opening, and an auxiliary filler member of a cross sectional shape to completely fill the slot and central opening in the main member.

7. The herein described system of filling tire casings with resilient fillers, which consists in providing main ring filler members of substantially the size and dimensions of the casings to be filled, and provided with key-hole shaped slots at their inner peripheries having flared sides, and providing a series of auxiliary filler rings for placement in and to fill said slots, the auxiliary fillers having different dimensions so that a filler suitable for a selected casing can be used for completely filling the casing.

Signed at Elgin, Illinois, this 12th day of April 1920.

JAMES H. DALBEY.